Patented June 1, 1937

2,082,171

UNITED STATES PATENT OFFICE

2,082,171

BASICALLY SUBSTITUTED AMINO ACRIDINE DERIVATIVES

Fritz Mietzsch and Hans Mauss, Wuppertal-Barmen, Germany, assignors to Winthrop Chemical Company Inc., New York, N. Y., a corporation of New York No Drawing. Application May 21, 1934, Serial No. 726,866. In Austria May 24, 1933

7 Claims. (Cl. 260—36)

This invention relates to new basically substituted acridine derivatives and is a further development of the invention described and claimed in our copending application for Letters Patent Ser. No. 534,460, filed May 1st 1931. The new acridine derivatives, similarly to the acridine compounds described in our copending application Ser. No. 534,460, are distinguished by a considerable efficacy on blood parasites.

The new acridine derivatives displaying the said antiparasitic properties and a particularly favorable relation between therapeutic and toxic action possess the general formula:

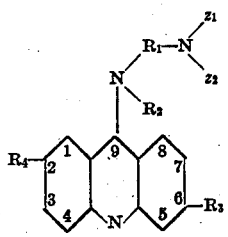

in which $R_1$ stands for an organic radical of the alkylene or phenylalkylene series, the carbon chain of which radical may contain nitrogen, oxygen or sulfur atoms as interrupting members, $R_2$ stands for hydrogen or alkyl, $z_1$ and $z_2$ stand for hydrogen, alkyl, amino- or alkylaminoalkyl, or jointly form with the adjacent N a ring of the piperidine type, the group

being attached to $R_1$ at least once, $R_3$ stands for halogen or alkyl and $R_4$ stands for an alkylmercapto group.

The new acridine compounds are produced by causing bases or salts thereof containing at least 2 basic nitrogen atoms one of which is present in the form of a primary or secondary amino group to react with such acridine substitution products as contain in the 9-position a replaceable substituent and in the 6-position a halogen atom or an alkyl group and which are substituted in the 2-position by an alkyl-mercapto group. Such replaceable substituents in the 9-position are, for example, ether- and ester-like groups, such as halogen, aryloxy, alkoxy, aryl- and alkyl-mercapto groups. Accordingly, the reaction performed in the said process may be represented by the following general equation:

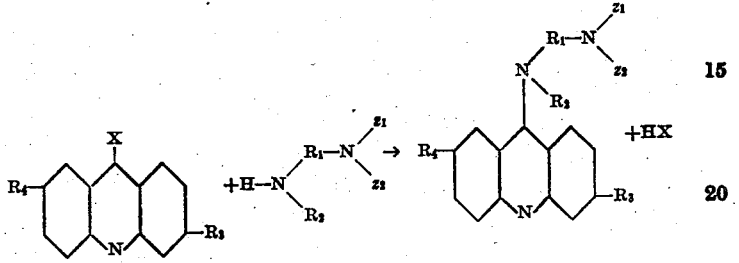

wherein $R_1$, $R_2$, $R_3$ and $R_4$ stand for one of the above indicated substituents and X stands for a replaceable ether- or ester-like bound substituent of the group consisting of halogen atoms, aryloxy, alkoxy, aryl- and alkyl-mercapto groups, which groups have proved equivalent as replaceable substituents in our present process. The reaction is preferably performed in phenolic solution while heating advantageously on the water-bath. Also other organic substances containing hydroxyl or sulfhydryl groups have proved to be suitable solvents in the present process, for example, ethylalcohol, glycol, amylalcohol, cresol, naphthol, thiophenol, and the like. The reaction temperature is advantageously about 130° C. when using these substances as solvents. If necessary the reaction is performed in closed vessels. Presumably when using the 9-halogen derivatives as starting materials the reaction sometimes takes place with the formation of acridines, containing the radical of the solvent used in ether- or thioether-like linkage in the 9-position, as intermediate products. The reaction is complete after heating for about one to several hours. The new base formed may be separated off by rendering the reaction mixture alkaline and taking up the base precipitated in an organic solvent, such as ether, methylene chloride or the like.

As basically substituted amines used as starting components, such amines have proved equivalent in the present process which are substituted by aliphatic, alicyclic, aromatic or heterocyclic radicals displaying, owing to their content of one or more nitrogen atoms, a distinctly basic character. The radicals may further contain substituents for example, the hydroxy group and ether- or thioether-like linkages. Especially those compounds which contain basic radicals constituted of aliphatic radicals, such as, for example, the diethylaminoethylamine- or the alpha-diethylamino-delta-pentylamine radical, are distinguished by their valuable properties in the therapeutic use.

It may be mentioned that for the introduction of the basic radical into the acridine derivative, bases can likewise be used in which, for example, one of the amino groups is occupied by a radical which can easily be split off, for example, an acyl radical, the acid radical being then subsequently split off in the known manner. The introduction of the basically substituted amine into the 9-position can also be carried out by building up the basic radical in several steps, for example, by causing an amino alcohol or an amino-substituted halogen compound to act on a substitution product of acridine of the kind specified and converting the acridine compounds produced in this manner, containing in the 9-amino group a halogenated or hydroxylated radical (if necessary, after esterification of the hydroxyl group, for example, by means of a hydrogen halide acid) by means of primary or secondary amines into the corresponding substitution products of 9-amino-acridine containing a basic radical in the amino group.

It may be further mentioned that the new acridine compounds are also obtainable by transforming diphenylamine-6-carboxylic acid amides which are basically substituted at the acid amide group and which contain in the 3-position a halogen atom or an alkyl group and in the 4'-position an alkyl-mercapto group into acridine derivatives in accordance with the following reaction scheme:

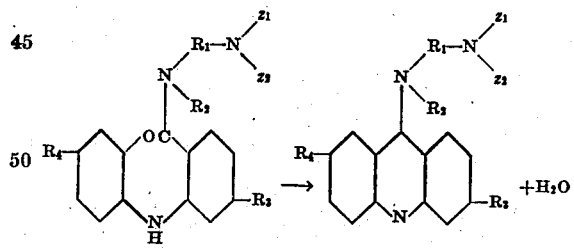

The new acridine derivatives are in the form of the free bases light yellow substances, melting at about 100° C. and soluble in the usual organic solvents, for example, ether, alcohol, acetone, benzene, methylenechloride and the like, insoluble in water, but soluble in diluted mineral and organic acids, such as hydrochloric, hydrobromic, sulfuric, formic, acetic, citric, tartaric, lactic, oxalic acid and the like. The salts of the new acridine bases with acids are obtainable in the customary manner. They are soluble in water and contain two equivalents of the acid on one mol. of the base. In general they decompose at about 150° C. and fluoresce in aqueous solution.

The invention is further illustrated by the following examples without being restricted thereto:—

*Example 1.*—29.4 grams of 2-methylmercapto-6.9-dichloroacridine are melted in the boiling water bath with 100 grams of phenol and 17 grams of alpha-diethylamino-delta-pentylamine are added to the melt drop by drop. After heating for 1 hour to 90°–100° C. the reaction mixture is introduced into 1000 ccs. of 2-n-caustic soda solution and the base which separates is taken up in ether. The ethereal solution is extracted with 10% acetic acid and the acetic acid solution is again extracted with ether after the addition of a caustic soda solution. From the ethereal solution of the new base thus obtained the orange-yellow citric acid salt of 2-methylmercapto - 6 - chloro - 9 - (alpha-diethylamino-delta-pentylamino)-acridine is obtained by means of an ethereal solution of citric acid. It is readily soluble in water and alcohol with an orange color and yellowish-green fluorescence.

The 2 - methylmercapto - 6.9 - dichloroacridine used as starting material is obtained by condensing 4-amino-thio-phenolmethylether with 2.4-dichlorobenzoic acid, subjecting the 4'-methylmercapto-3-chloro-diphenylamine-6-carboxylic acid formed (whitish needles melting at 196°–197° C. when recrystallized from alcohol) to ring closure and chlorinating the acridone compound formed. The 2-methylmercapto-6.9-dichloroacridine thus obtainable forms yellow crystals melting at 184°–185° C. (with previous sintering) when recrystallized from benzene.

On replacing the alpha-diethylamino-delta-aminopentane by 16 grams of alpha-diethylamino-delta-aminobutane (boiling at 62° C. under 6 mm. pressure, the picrate melting at 157°–158° C.), the citrate of 2-methylmercapto-6-chloro-9 - (alpha-diethylamino-delta-butylamino) - acridine is obtained which resembles the pentyl compound in all its properties.

2-methylmercapto - 6 - chloro-9-(beta-diethylaminoethoxyethylamino)-acridine is obtained when reacting upon 2-methylmercapto-6.9-dichloro-acridine with beta-diethylaminoethoxyethylamine in the manner described above. By double decomposition of the solution of its hydrochloride with a solution of sodium methylenedisalicylate an orange-yellow powder is obtained which is insoluble in water but readily dissolves in alcohol.

2- methylmercapto -6- chloro-9-(beta-diethylamino-ethylmercapto - ethylamino)-acridine is obtained by reacting upon the aforementioned 2-methylmercapto-6.9-dichloroacridine with beta-diethylaminoethylmercapto-ethylamine in the manner described above. It likewise forms with methylenedisalicylic acid a salt in the form of an orange-yellow powder.

*Example 2.*—30.8 grams of ethylmercapto-6.9-dichloroacridine are treated with 17 grams of alpha-diethylamino-delta-aminopentane in accordance with the directions given in Example 1. By the addition of an ethereal solution of hydrogen chloride to the ethereal solution of the new base the dihydrochloride of the 2-ethylmercapto -6 - chloro - 9 - (alpha - diethylamino - delta-pentylamino)-acridine is obtained as a yellow highly hygroscopic precipitate. From its aqueous solution it may be obtained in the form of a yellow powder by the addition of an aqueous solution of the sodium salt of methylene-disalicylic acid or other high molecular organic acids by double decomposition. The yellow powder is insoluble in water. On the other hand, the citrate is readily soluble in water. The same is the case with the citrate of the 2-ethylmercapto-6-chloro- 9 - (alpha - diethylamino-gamma-propylamino)-acridine which can be obtained by replacing the alpha-diethylamino-delta-aminopentane by alpha-diethylamino-gamma-aminopropane boiling at 59° C. under 8 mm. pressure.

The 2-ethylmercapto-6.9-dichloroacridine used as starting material is a yellow crystal powder melting at 126°-127° C. when recrystallized from ligroin. It is obtained by condensing 4-aminothiophenolethylether with 2.4-dichloro-benzoic acid, subjecting the 4'-ethylmercapto-3-chloro-diphenylamine-6-carboxylic acid (small yellow needles melting at 177°-178° C. when recrystallized from alcohol) obtained to ring closure and chlorinating the acridone compound formed.

*Example 3.*—27.4 grams of 2-methylmercapto-6-methyl-9-chloroacridine are treated with 17 grams of alpha-diethylamino-delta-aminopentane in accordance with the directions given in Example 1. The citrate of the 2-methylmercapto-6-methyl-9- (alpha-diethylamino - delta-pentylamino)-acridine is a yellow crystal powder. The free base is precipitated from the aqueous solution of the citrate as a yellow oil by means of dilute caustic soda solution, sodium carbonate or ammonia solution. The yellow oil is readily soluble in ether, methylene chloride, benzene, alcohol, etc.

On replacing the alpha-diethylamino-delta-aminopentane by alpha-diethylamino-beta-beta-dimethyl-gamma-aminopropane (boiling at 76° C. under 16 mm. pressure), the citrate of the 2- methylmercapto- 6- methyl-9-(alpha-diethyl-amino- beta - beta - dimethyl - gamma - propyl - amino)-acridine possessing the same properties is obtained.

The 2-methylmercapto-6-methyl-9-chloroacridine used as starting material forms lemon-yellow crystals melting at 143° C. when recrystallized from benzene. It is obtained by condensing 4-aminothiophenolmethylether with 4-methyl-2-chloro-benzoic acid, subjecting the 4'-methyl-mercapto-3-methyldiphenylamine-6-carboxylic acid formed (whitish crystals melting at 190° C. when recrystallized from benzene) to ring closure and chlorinating the acridone compound formed.

2-methylmercapto-6-methyl-9-(alpha-diethyl-amino-epsilon-pentylamino)-acridine is obtained when reacting upon the aforementioned 2-methylmercapto-6-methyl-9-chloroacridine with alpha-diethylamino-epsilon-aminopentane in the manner described above. It forms a yellow citrate which is readily soluble in water.

2-butylmercapto- 6 -chloro- 9 -(alpha-diethyl-amino-delta-pentylamino)-acridine is obtained by reacting upon 2-butylmercapto-6.9-dichloro-acridine with alpha-diethylamino-delta-amino-pentane in the manner described above. It forms an orange-yellow citrate which is readily soluble in water.

The 2-butylmercapto-6.9-dichloroacridine used as starting material forms a yellow crystal powder melting at 88°-89° C. when recrystallized from ligroin. It is obtained by condensing 4-butylmercapto-1-aminobenzene (boiling at 155°-156° C. under 7 mm. pressure) with 2.4-dichloro-benzoic acid, subjecting the 4'-butylmercapto-3-chloro-diphenylamine-6-carboxylic acid formed (crystals melting at 153°-154° C. when recrystallized from alcohol) to ring closure and chlorinating the acridone compound formed.

2-isooctylmercapto-6-chloro-9-(alpha-diethyl-amino-delta-pentylamino)-acridine is obtained when reacting upon 2-isooctylmercapto-6.9-dichloroacridine with alpha-diethyl-amino-delta-aminoacridine in the manner described above. It forms a deep yellow citrate which is readily soluble in water.

The 2- isooctylmercapto- 6.9 -dichloroacridine used as starting material is a yellow crystal powder melting at 80°-81° C. when recrystallized from ligroin. It is obtained by condensing 4-isooctyl-mercapto-1-aminobenzene (boiling at 177°-179° C. under 6 mm. pressure) with 2.4-dichloroben-zoic acid, subjecting the 4'-isooctylmercapto-3-chlorodiphenyl-amine-6-carboxylic acid (yellowish crystals melting at 85°-86° C. when recrystallized from petroleum ether) formed to ring closure and chlorinating the acridone compound obtained.

We claim:—

1. The acridine derivative of the formula:

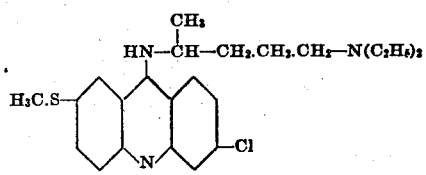

which forms an orange-yellow citric acid salt which is soluble in water and alcohol.

2. The acridine derivative of the formula:

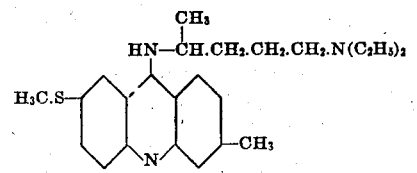

which forms a yellow crystalline, water-soluble citrate.

3. Acridine derivatives of the general formula:

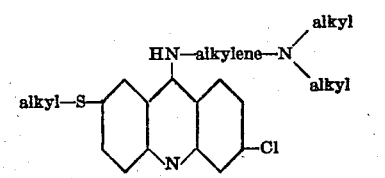

which compounds are light yellow substances, insoluble in water, soluble in dilute mineral acids, with which they form water-soluble salts.

4. Acridine derivatives of the general formula:

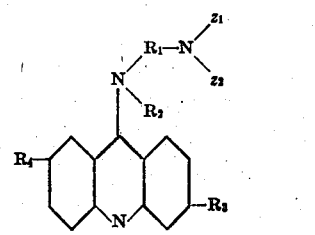

wherein $R_1$ stands for an organic radical selected from the group consisting of radicals of the alkylene and phenylalkylene series including those which are substituted by hydroxyl, and the carbon chain of which contains as an interrupting member an atom selected from the group consisting of nitrogen, oxygen and sulfur atoms, $R_2$ stands for a substituent selected from the group consisting of hydrogen and alkyl, $z_1$ and $z_2$ stand for substituents selected from the group consisting of hydrogen, alkyl, aminoalkyl, alkylaminoalkyl and alkylene groups, the alkylene group standing jointly for $z_1$ and $z_2$, the group

being attached to $R_1$ at least once, $R_3$ stands for a substituent selected from the group consisting of halogen and alkyl, and $R_4$ stands for an alkyl-mercapto group, which acridine derivatives are light yellow substances, insoluble in water, soluble in dilute mineral acids, with which they form water-soluble salts.

5. Acridine derivatives of the general formula:

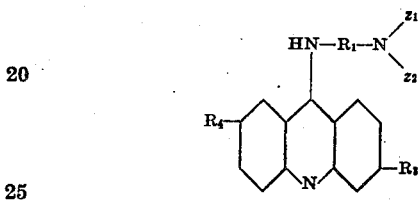

wherein $R_1$ stands for an organic radical selected from the group consisting of radicals of the alkylene and phenylalkylene series including those which are substituted by hydroxyl, and the carbon chain of which contains as an interrupting member an atom selected from the group consisting of nitrogen, oxygen and sulfur atoms, $z_1$ and $z_2$ stand for substituents selected from the group consisting of hydrogen, alkyl, aminoalkyl, alkylaminoalkyl and alkylene groups, the alkylene group standing jointly for $z_1$ and $z_2$, $R_3$ stands for a substituent selected from the group consisting of halogen and alkyl, $R_4$ stands for an alkyl-mercapto group, which acridine derivatives are light yellow substances, insoluble in water, soluble in dilute mineral acids, with which they form water-soluble salts.

6. Acridine derivatives of the general formula:

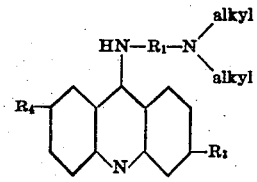

wherein $R_1$ stands for an alkylene group, $R_3$ stands for a substituent selected from the group consisting of halogen and alkyl and $R_4$ stands for an alkyl-mercapto group, which acridine derivatives are light yellow substances, insoluble in water, soluble in dilute mineral acids, with which they form water-soluble salts.

7. Acridine derivatives of the general formula:

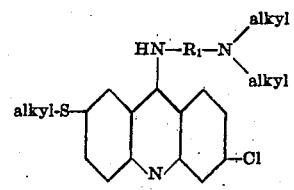

wherein $R_1$ stands for an organic radical selected from the group consisting of radicals of the alkylene and phenylalkylene series including those which are substituted by hydroxyl, and the carbon chain of which contains as an interrupting member an atom selected from the group consisting of nitrogen, oxygen and sulfur atoms, which acridine derivatives are light yellow substances, insoluble in water, soluble in dilute mineral acids, with which they form water-soluble salts.

FRITZ MIETZSCH.
HANS MAUSS.

Certificate of Correction

Patent No. 2,082,171.  June 1, 1937.

FRITZ MIETZSCH ET AL.

It is hereby certified that error appears in the printed specification of the above numbered patent requiring correction as follows: Page 2, first column, lines 45 to 54, inclusive, in the formula, for

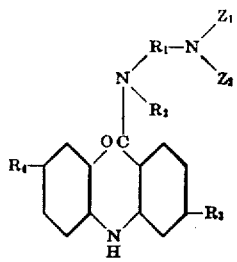

read

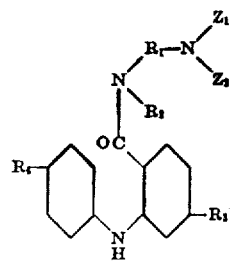

and that the said Letters Patent should be read with this correction therein that the same may conform to the record of the case in the Patent Office.

Signed and sealed this 17th day of August, A. D. 1937.

[SEAL]

LESLIE FRAZER,
*Acting Commissioner of Patents.*